United States Patent [19]

Rylewski

[11] Patent Number: 5,497,762
[45] Date of Patent: Mar. 12, 1996

[54] DEVICE FOR COLLECTING SOLAR ENERGY AND TRANSFERRING IT TO A RECEPTION BODY TO BE HEATED

[76] Inventor: Eugeniusz M. Rylewski, 43bis, avenue du Général Leclerd, 78470 Saint Remy Les Chevreuse, France

[21] Appl. No.: 302,843

[22] PCT Filed: Mar. 31, 1993

[86] PCT No.: PCT/FR93/00326

§ 371 Date: Sep. 16, 1994

§ 102(e) Date: Sep. 16, 1994

[87] PCT Pub. No.: WO93/20390

PCT Pub. Date: Oct. 14, 1993

[30] Foreign Application Priority Data

Apr. 1, 1992 [FR] France .................. 92 03962

[51] Int. Cl.⁶ .................................................. F24J 2/00
[52] U.S. Cl. .................. 126/702; 126/624; 126/648; 126/649; 126/650; 126/701; 126/703
[58] Field of Search .................. 126/702, 648, 126/649, 650, 624, 701, 703

[56] References Cited

U.S. PATENT DOCUMENTS

| | | |
|---|---|---|
| 4,088,117 | 5/1978 | Keyes . |
| 4,220,137 | 9/1980 | Tesch et al. . |
| 4,301,787 | 11/1981 | Rice ............................................ 126/702 |
| 4,370,974 | 2/1983 | Maxey . |
| 4,424,800 | 1/1984 | Ortega ..................................... 126/703 X |
| 4,649,901 | 3/1987 | Kelly ........................................ 126/702 X |
| 4,715,358 | 12/1987 | Köster ....................................... 126/702 |
| 5,039,352 | 8/1991 | Mueller et al. .......................... 126/703 |

FOREIGN PATENT DOCUMENTS

| | | |
|---|---|---|
| 2353026 | 12/1977 | France . |
| 2653528 | 4/1991 | France . |
| 2646262 | 4/1978 | Germany . |
| WO80/02712 | 12/1980 | WIPO . |
| WO87/00607 | 1/1987 | WIPO . |

OTHER PUBLICATIONS

"Solartechnik", *Deutsche Bauzeitschrift—DBZ*, No. 2, Feb. 1988, Gutersloh de, pp. 205–108.

*Primary Examiner*—Larry Jones
*Attorney, Agent, or Firm*—Staas & Halsey

[57] ABSTRACT

The device for collecting solar energy and transferring it to a reception body to be heated includes a plurality of parallel profiled elements and a closure mechanism. The profiled elements are spaced apart and superposed in order to form a curtain having an outer face suitable for being exposed to solar radiation and an inner face suitable for being located on the reception body side. The profiled elements have two reflecting faces and a shape such that when the inner face is vertical, the profiled elements slope downwardly from the inner face to the outer face. The profiled elements define a plurality of air channels directed upwards from the outer face to the inner face when the inner face is vertical. The profiled elements and the two reflecting faces thereof are formed of an insulating material so as not to conduct heat from the outer face to the inner face. The closure mechanism is provided on at least one of the inner face and the outer face of the curtain and functions in sealing air contained in the channels.

17 Claims, 5 Drawing Sheets

DEVICE FOR COLLECTING SOLAR ENERGY AND TRANSFERRING IT TO A RECEPTION BODY TO BE HEATED

BACKGROUND OF THE INVENTION

1. Field of the Invention

The invention relates to a device for collecting solar energy and transferring it to a reception body to be heated.

2. Description of the Related Art

It has long been sought to collect solar energy for heating a reception body such as, for example, an outer wall of a building or a volume of air inside a building.

This energy recuperation is of interest in particular for providing, during cold weather, supplementary heat energy to reception bodies forming part of buildings or other structures exposed to solar radiation, even of low intensity.

For this purpose, various means are known, such as for example black- or dark-coloured coatings which are applied onto the reception surfaces exposed to the solar radiation. These coatings, which function according to the black body principle, have the advantage of providing high solar reception and recuperation throughout the entire period when they are exposed to the solar radiation.

However, as soon as this radiation ceases, in particular when the sun has gone down, these known coatings give out, because of heat losses, a large portion of the heat energy which they have previously collected and stored. Such coatings actually have a loss coefficient which is generally of the order of 6 to 8 W/°C./m².

Since these losses are proportional to the difference between the temperature reached by the coating and the temperature of the ambient outer medium, the heat release is commensurately higher as this difference is greater.

Furthermore, solar energy recuperation devices are known which are also called "transparent insulations", and which comprise transparent walls, of glass or plastic, which extend in directions parallel or perpendicular to the reception surfaces to be heated.

These transparent insulations are intended to allow the solar radiation to pass and to store the heat energy.

A typical example of these devices is that of greenhouses used in horticulture.

These devices of the type with transparent insulation may be combined, as appropriate, with dark-coloured coatings such as indicated above. They themselves also have the drawback of having high heat losses when they are no longer exposed to the solar radiation.

Furthermore, the known devices mentioned hereinabove also have the drawback of continuously collecting solar energy, in particular in hot weather, that is to say at a time when, for certain applications, the recuperation of this energy is not desired, and is even deleterious.

It is then necessary to provide means for making these devices inoperative when the user so desires.

SUMMARY OF THE INVENTION

It is consequently an object of the invention to provide a device for collecting solar energy on a reception body to be heated, which overcomes the abovementioned drawbacks.

It is in particular an object of the invention to provide such a device which makes it possible to collect the solar energy and which has a small heat loss coefficient.

It is also an object of the invention to provide such a device which has a structure which is simple and therefore inexpensive to produce.

It is furthermore an object of the invention to provide such a device which makes it possible to collect the solar energy in a controlled manner, to avoid excessively high heat recuperation when the device is subjected to intense solar radiation.

It is also an object of the invention to provide such a device which may be used on buildings and other structures.

The invention provides for this purpose a device of the type defined in the introduction, comprising a plurality of substantially horizontal profiled elements, spaced apart and superposed in order to form a curtain having an outer face suitable for being exposed to solar radiation and an inner face suitable for being located on the reception body side, in which the profiled elements have two reflecting faces and a profile with shape chosen so as to define between them a plurality of air channels directed upwards from the outer face to the inner face, and in which the profiled elements do not conduct heat from the outer face to the inner face, closure means being provided on the inner face side and/or of the outer face of the curtain in order to immobilise the air contained in the channels.

The reflecting faces of the profiled elements thus make it possible to convey the solar energy to the inner face of the curtain situated on the side of the reception body. Furthermore, heating of the air contained in the channels defined between the profiled elements is produced.

Because of the difference in density, hot air tends to rise and cool air tends to fall. Because of the upwards configuration of the channels, the hot air tends to rise towards the inner face of the curtain, which is closed, while the cool air tends to fall towards the outer face of the curtain. In this manner, a heat-convection plug is created in the upper part of the channels, that is to say in proximity to the inner face of the curtain which is situated adjacent to the reception body to be heated.

A plurality of hot air layers is thus created, which are immobilised and which at the same time constitute a very good insulator, with a small heat loss coefficient.

An efficient insulator is thus obtained which also allows the solar energy to pass through it, by virtue of the reflections on the reflecting faces of the profiled elements. This energy encounters a reception surface, that is to say the closed inner face of the curtain which is preferably of dark colour. This energy is converted into heat energy and can no longer escape outwards, given that the infrared radiation is reflected only with difficulty. A heat non-return valve is thus obtained.

In a first embodiment of the invention, each profiled element consists of a thin film of curved profile, formed from a material which does not conduct heat.

In another embodiment of the invention, each profiled element consists of two thin films with curved profile, formed from a material which does not conduct heat and joined together along two end edges in order to define between them an insulating space filled with air.

In this latter case, the insulating properties of the device are further improved since each profiled element contains a certain volume of air forming insulator.

In both preceding embodiments, the thin film is advantageously formed from a material chosen from paper, cardboard, plastics and other similar materials.

Layers of plastic may in particular be used such as polyethylene or polyester. If a transparent material is involved, it is possible to provide a reflecting coating on one of the two faces of the film, although it is in general preferable to provide such a coating on both faces. It may involve, for example, a coating formed by aluminium deposition, the coating being advantageously protected by a varnish.

In another embodiment of the invention, each profiled element is a solid element having a profile corresponding to that of a turbine blade. This solid element may be produced for example from plastic, concrete, wood, etc.

In the preceding embodiments, the profiled elements have a constant profile chosen such that the solar radiation indirectly reaches the reception body by successive reflections on their reflecting faces, and to do this so that the reception body does not "see" the outer face of the curtain, in order to form a radiation plug. In this manner, at least one radiation plug is formed.

For this purpose, the device may comprise either profiled elements with curved profiles, or profiled elements with a terraced or staircase profile. In this latter case, a plurality of successive radiation plugs is obtained.

As a variant, it is possible to use profiled elements having a generally rectilinear profile. In this case, the reception body "sees" the outer face of the curtain or the outer medium, and a radiation plug is not created.

The profile of the profiled elements may be chosen as a function of the geographical latitude of the location where the device is to be installed, in order to optimise the passage of the solar radiation inside the channels. In this manner, it is possible to provide heating in cold or winter weather when the rays of the sun are inclined to the horizon by a small angle, and conversely to prevent such heating when the rays of the sun are steeply inclined to the horizontal.

In another embodiment of the invention, each profiled element has a variable profile and comprises a fixed part which extends upwards from an intermediate region of the curtain towards the inner face of the latter, and an adjustable pivoting part which extends from the outer face of the curtain towards the intermediate region, which constitutes a pivot between the fixed part and the pivoting part.

Thus, it is possible to adjust the respective pivoting parts of the profiled elements in order to allow the heating of the reception surface, or conversely to prevent this heating, and to do this according to the desires of the user.

According to yet a further embodiment of the invention, the device furthermore comprises a plurality of auxiliary members respectively extending the profiled elements on the outer face side of the curtain, each auxiliary member having an upper surface of dark colour and a lower reflecting surface.

These auxiliary members may be fixed or movable and are oriented as a function of the geographical location of installation of the device.

Thus, in winter, when the solar radiation is inclined to the horizon by a small angle, reflections by the reflecting walls of the annular members are obtained, which leads to heating of the reception body.

In contrast, in summer, when the solar radiation is steeply inclined with respect to the horizon, the radiation strikes the dark upper surfaces of the auxiliary members. These latter are thus heated, and the heat is released by convection outwards, without heating the reception body.

In another variant embodiment, the profiled elements are arranged so as to converge from the outer face to the inner face, the surface area of the outer face being greater than the surface area of the inner face.

A concentration effect is thus obtained which may be particularly advantageous for heating a wall, a water tank, etc.

In the embodiments previously described, the device advantageously comprises a panel of general rectangular shape supporting a plurality of profiled elements. It is thus possible to manufacture panels in the workshop and subsequently to fit them at the installation site.

In the various previously described embodiments of the invention, the outer face of the curtain may be open, or alternatively covered with a transparent plate, for example of glass or plastic. Such a plate makes it possible to protect the curtain, in particular in regions where strong prevailing winds exist.

The inner face of the curtain, which is closed, is advantageously fitted with a dark-coloured coating, preferably black, so that the solar energy encountering this surface is converted into heat energy.

The device according to the preceding embodiments is most particularly suitable for being applied to the outside of a building, for example along an inclined vertical wall. It may also be applied against a wall of a tank or a water cistern in order to heat this water.

In another embodiment of the invention, the device is intended in itself to form a transparent or non-transparent wall.

In this case, the outer face of the curtain is fitted with a transparent plate, while the inner face is fitted with a dark or transparent plate. In the case when both the inner face and the outer face are fitted with a transparent plate, a transparent wall is obtained, which may be used in particular for making greenhouses, glass walls for sports halls, auditoria, etc.

In another embodiment of the invention, the device is produced in the form of a blind which corresponds to a slatted blind of the Venetian blind type. The profiled elements may then be brought together or moved apart from each other using draw cords or the like. This blind is advantageously used behind a glazed surface inside a building.

In this last embodiment, the closure means provided on the side of the inner face of the curtain are advantageously formed by a gusset joining the profiled elements in pairs.

On the same principle, it is possible to produce a shutter, which can be used in front of or behind a window of a building, in which the profiled elements are rigidly joined together.

In the various embodiments of the invention, the profiled elements may be superposed in a substantially vertical plane, or in a plane inclined, for example, at 45° to the vertical, as a function of the configuration of the reception body to be heated.

BRIEF DESCRIPTION OF THE DRAWINGS

In the following description, which is given solely by way of example, reference is made to the attached drawings, in which.

DETAILED DESCRIPTION OF THE PREFERRED EMBODIMENTS

Figure 1:
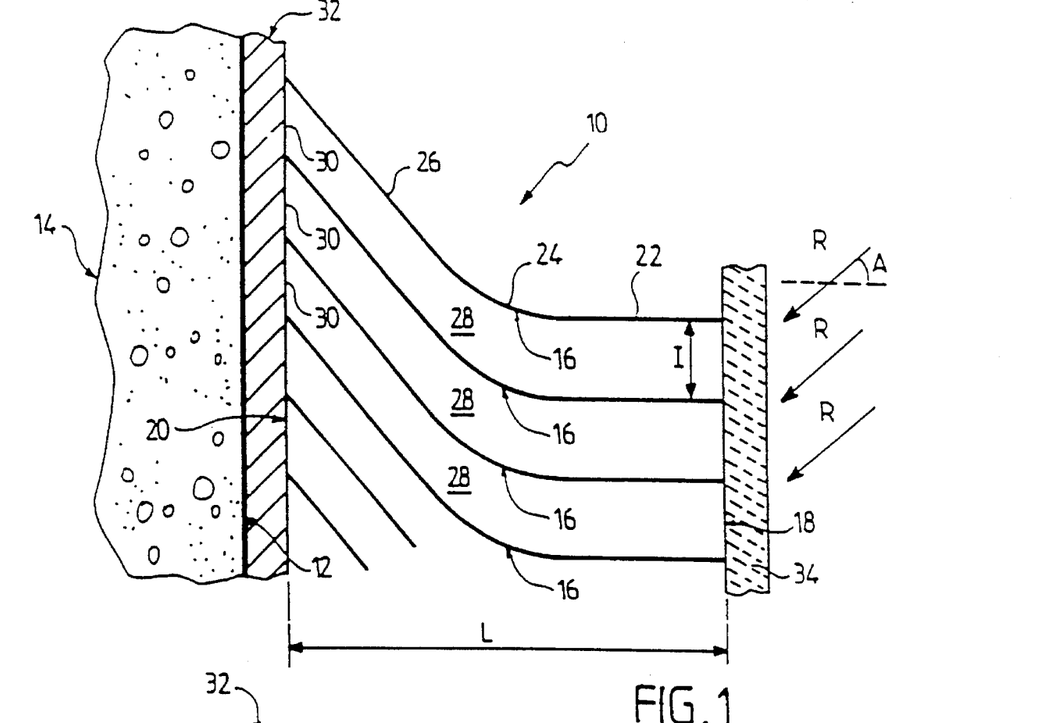
FIG. 1 is a partial cross-sectional view of a device according to a first embodiment of the invention applied against a reception body.

Reference is first made to FIG. 1, which represents a device 10 according to the invention applied against a reception body, which, in the example, constitutes the outer surface 12 of a wall 14 which is vertical or possibly inclined to the vertical.

The device 10 comprises a plurality of substantially horizontal, identical, profiled elements 16, spaced apart and superposed in a plane parallel to the surface 12, that is to say in a substantially vertical plane in order to form a sort of curtain. This curtain has an outer face 18 suitable for being exposed to solar radiation R, and an opposite inner face 20 suitable for being located on the reception surface 12 side.

Each of the profiled elements 16 consists, in the example, of a thin film with curved profile formed from a material which does not conduct heat. In the example, it involves a film of plastic, for example of polyethylene or polyester having a thickness of a few tens of microns.

This film is produced transparent or non-transparent and coated on one of its faces, preferably on both faces, with a reflecting layer, for example a layer of aluminium. The reflecting layer applied on one or both faces of the film may advantageously be protected by a transparent varnish. If the film is transparent, a single reflecting layer may be sufficient in certain cases. In the example, the width L of the curtain, as defined between the outer face 18 and the inner face 20, may be of the order of 5 to 20 cm, and the interval I between two successive elements 16 of the order of a centimeter, for example 2 cm.

Each profiled element 16 has a profile of chosen shape which, in the example, first of all comprises a substantially horizontal part 22 which extends from the outer face 18 and is connected, via a curved part 24, to a substantially rectilinear part 26 which rises progressively towards the inner face 20.

Each profiled element 16 is shaped by curving a film of the previously described material in order to impart to it the shape of the represented profile.

The profiled elements 16 define between them a plurality of air channels 28 for forming a succession of superposed air cushions, each channel being directed upwards from the outer face 18 to the inner face 20.

The device furthermore comprises closure means 30 provided on the inner face 20 side of the curtain. These means may take various shapes. In the example, they are formed by a backplate 32 intended to support a plurality of elements 16, as will be seen further on.

As a variant, the plate 32 may be replaced by a single web of material, or even completely removed in the case when the profiled elements 16 reach as far as the reception surface 12. The plate 32 is advantageously fitted with a dark-coloured coating on its face directed outwards.

The function of the closure means 30 is to block, at least partially, the channels 28 on the side of the outer face 20.

In the example represented, the outer face 18 is covered with a transparent plate 34 of glass or plastic intended to allow the solar radiation R to pass.

As a variant, it is possible to leave the outer face 18 completely open, or alternatively to provide it with a grid for protection against impacts, since this face is exposed to the outside.

The profiled elements 16 have a profile chosen so that the solar radiation R penetrating through the inner face 18 of the curtain undergoes a succession of reflections, on the part of the reflecting faces of the profiled elements, so as to be able to propagate towards thinneral face 20 by following the rising path of the channels 28. It is, however, preferable to minimise the number of reflections in order to avoid the losses due to each reflection.

Most of the short-wavelength solar radiation reaching the inner face 20 is converted into long-wavelength heat radiation which can no longer escape because the inner face 20 is closed.

A small portion of the solar radiation absorbed by the reflecting profiled elements 16 heats the air contained in the channels 28, the heated air rising in the direction of the inner face 20 because of its lower density, and the cold air falling towards the inner face 18 because of its higher density.

Under these conditions, the air heated by the solar radiation is immobilised on the inner face 20 side and thus heats the reception surface 12, while forming an insulation preventing rapid cooling of the reception surface 12 when the device 10 no longer receives solar radiation.

The particular shape of the profile of the elements 16 is chosen in particular as a function of the geographical latitude of the place where the device is to be installed, and this is done in order to take into account the angle of inclination A of the solar radiation R with respect to the horizontal.

In fact, by appropriately choosing the profile of the elements 16, it is possible to arrange for the heating effect only to be obtained when the angle A is in a specified range. In this case, most of the solar radiation reaches the plate 32 and is converted there into heat, whereas a small portion of the solar radiation is absorbed by the profiled elements, thus heating the air contained in the channels.

Thus, it is possible to arrange to heat the reception surface 12 solely in winter when the angle A is below a predetermined threshold, and to prevent this heating in the summer when the angle A is above a specified threshold.

Figure 2:
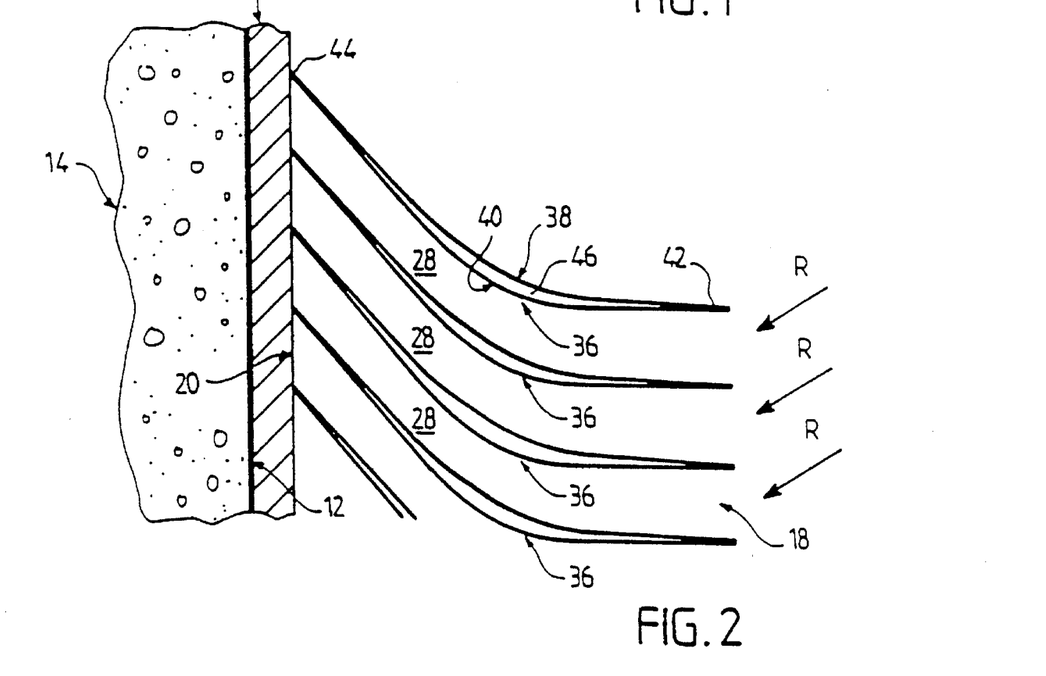
FIG. 2 is a partial cross-sectional view of a device according to a second embodiment of the invention applied against a reception body.

The embodiment in FIG. 2 closely corresponds to that in FIG. 1, except that it includes elements 36, each of which consists of two thin films 38 and 40 of curved profile, formed from a material which does not conduct heat, these two films being joined together along two end edges: an edge 42 on the side of the outer face 18, and an edge 44 on the inner face 20 side.

There is thus formed between the two films 38 and 40 of the same element 36 an insulating space 46 which is filled with air and which makes it possible to improve the insulating properties of the device compared to that in FIG. 1. Otherwise, the device in FIG. 2 functions in the same manner as that in FIG. 1. In the embodiment in FIG. 2, the outer face 18 is open and a transparent plate is not provided. As required, the outer face 18 may be protected by a grid (not shown). The inner face 20 is closed by a backplate 32 similar to that in FIG. 1.

Figure 3:
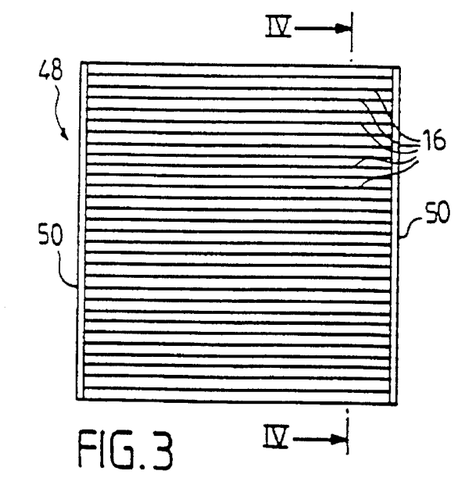
FIG. 3 is an elevation of a panel supporting a device according to that in FIG. 1.
Figure 4:
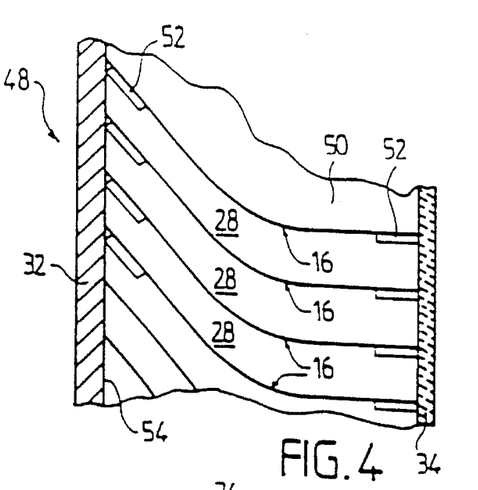
FIG. 4 is a partial sectional view on an enlarged scale along the line IV—IV in FIG. 3.

Reference is now made to FIGS. 3 and 4 which represent a panel 48 of general rectangular shape having a backplate 32 similar to that in FIGS. 1 and 2. The panel may have, by way of example, a square shape of dimensions 60 cm×60 cm. In the example, the panel 48 comprises two borders 50 intended to be arranged vertically and between which are tensioned the profiled elements 16, each consisting of a film as described in FIG. 1. Each profiled element 16 is brought to the desired shape and is then fixed between the two borders 50 by adhesive supports 52 (FIG. 4). In the example, each of the elements 16 is fixed to each of the borders 50 by two adhesive elements 52, one situated near the plate 34, and the other situated near the backplate 32. Obviously, it is possible to provide other types of fastening means, so long as each element 16 retains the desired profile and is tensioned between the borders 50.

The backplate 32 may, as required, comprise a dark-coloured coating 54, for example black, on its face directed outwards, and this is in order to improve the solar reception properties of the device.

The panel represented in FIGS. 3 and 4 could, as a variant, be fitted with the profiled elements 36 of the device in FIG. 2.

In the embodiments in FIGS. 1 and 2, the profiled elements 16 or 36 have a constant profile chosen so that the solar radiation indirectly reaches the reception surface by reflection on their reflecting faces.

In the embodiment in FIG. 5, to which reference will now be made, the device comprises profiled elements 56 of variable profile. Each element 56 comprises a fixed part 58 which extends upwards from an intermediate region 60 of the curtain towards the inner face 20 of the latter, as well as an adjustable pivoting part 62 which extends from the outer face 18 of the curtain towards the intermediate region 60.

Each of the parts 62 can pivot around a pivot with horizontal axis situated along the intermediate region 60. The respective parts 62 of the elements 56 are joined together by a connection member 64 arranged vertically, and capable of sliding upwards or downwards as represented by the arrow F. The respective parts 62 of the elements 56 can therefore pivot synchronously between two extreme positions (represented in a dashed line) and a plurality of intermediate positions, one of which is represented in a solid line.

In this manner, it is possible to control the solar radiation which penetrates into the channels 28 as far as the inner face 20 of the curtain. Thus, the efficiency of the device may be optimised when heating is necessary and be stopped when such heating is not needed.

In the example, the respective parts 58 and 62 of the profiled elements 56 are formed from thin elements, preferably of plastic, these elements there again being fitted with a reflecting coating on both their faces.

Figures 5, 6:
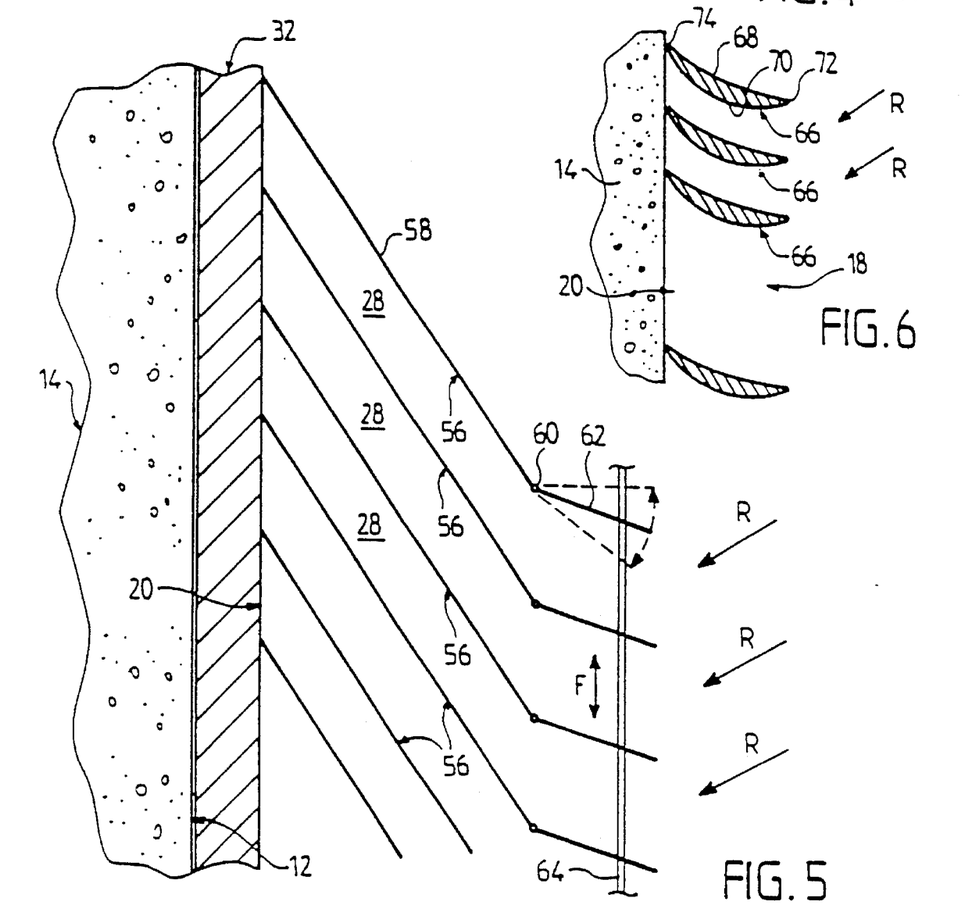
FIG. 5 is a partial cross-sectional view of a device according to a third embodiment of the invention applied against a reception body.
FIG. 6 is a partial sectional view of a device According to a fourth embodiment of the invention.

The device in FIG. 5 may be integrated with a panel of the type represented in FIGS. 3 and 4. In the example, the device in FIG. 5 comprises a backplate 32 on the inner face 20 side, the outer face 18 being open.

In the embodiment in FIG. 6, the device comprises profiled elements 66 consisting of solid elements having a constant profile corresponding to that of a turbine blade. These solid elements may be produced of any appropriate material, which does not conduct heat, for example plastic, concrete, wood, etc.

The elements 66 are normally provided to have a dimension greater than that of the elements 16, 36 and 56 previously described. By way of example, their width may be between 10 and 30 cm, and the interval separating two elements may be of the order of 5 to 10 cm.

The solid elements in FIG. 6 are intended essentially to be placed outside a wall 14 of a building, but may also be used for other applications, for example for heating a water tank, etc.

Each element 66 is delimited by two opposite surfaces 68 and 70 which are connected together along a first end edge 72 situated on the outer face 18 side and along a second end edge 74 which is connected along the inner face 20.

In the embodiment in FIG. 7, to which reference will now be made, the device corresponds to that in FIG. 2, the curtain furthermore comprising a transparent plate 34 similar to that of the device in FIG. 1.

Figure 7:
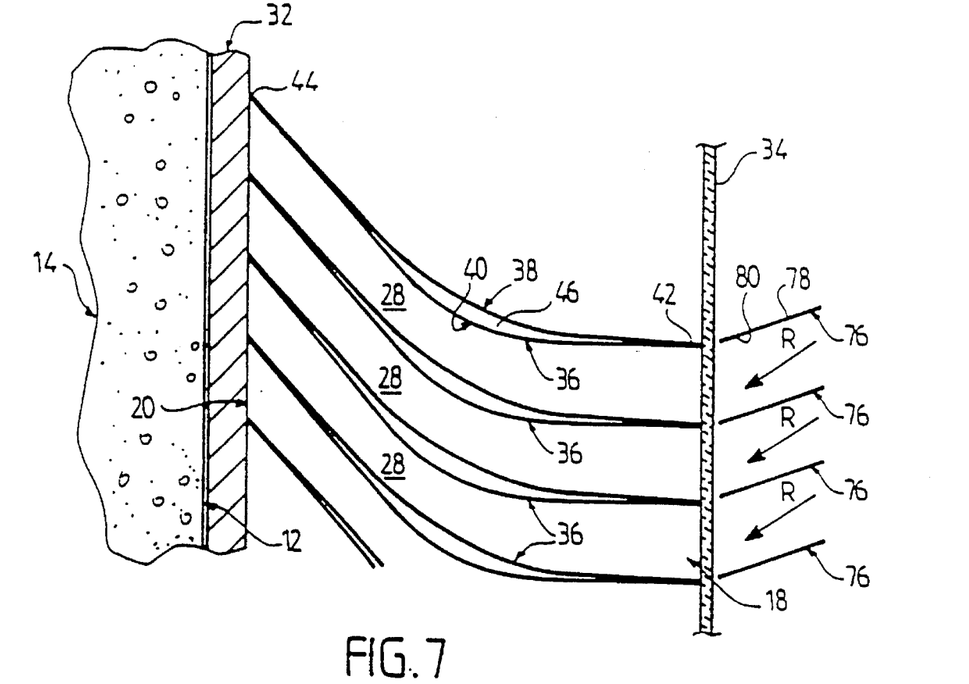
FIG. 7 is a partial cross-sectional view of a device according to a fifth embodiment of the invention, which corresponds to the device in FIG. 2, and which is furthermore fitted with outer auxiliary members.

Furthermore, the device in FIG. 7 comprises a plurality of auxiliary members 76 respectively extending the profiled elements 36 on the side of the outer face 18 of the curtain. Each auxiliary member 76 has an upper face 78 of dark colour and an lower reflecting surface 80.

The auxiliary devices 78 may be mounted fixed or adjustably. In principle, these auxiliary members are slightly inclined to the horizontal.

In winter, the solar radiation is inclined to the horizontal by a small angle and is reflected against the lower reflecting surfaces 80 in order then to penetrate into the channels 28 and thus heat the wall 14.

In summer, the solar radiation is steeply inclined to the horizontal and strikes the surfaces 78 of dark colour, which heats the latter. The heat thus produced is then released outwards by convection, without going to the inside of the device. Obviously, the auxiliary members 78 could be used with profiled elements having different profiles.

In the embodiments previously described, the profiled elements have curved profiles so that the inner face 20 of the curtain does not "see" the outer face 18, which allows a radiation plug to be formed.

Figure 8:
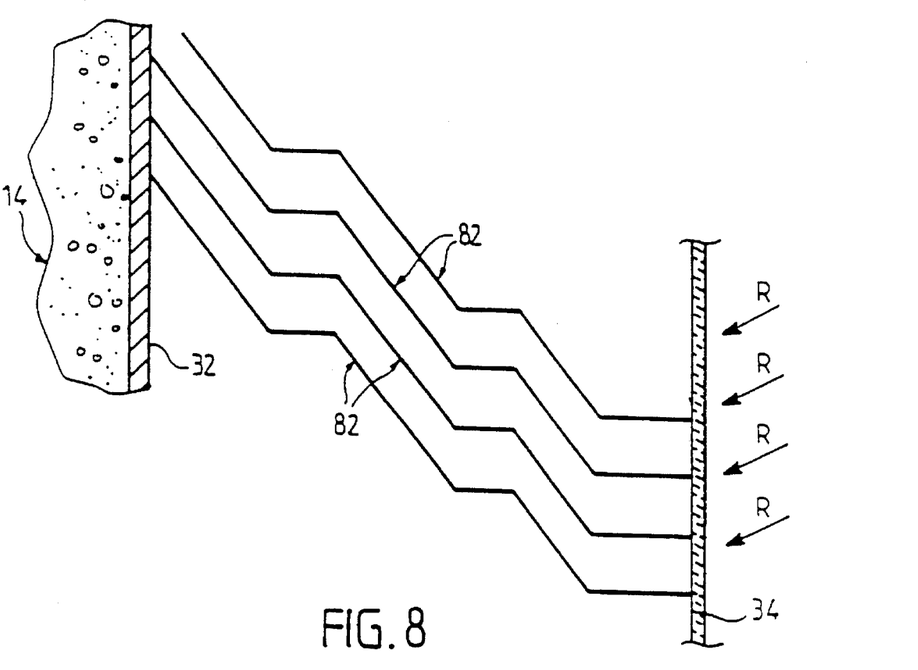
FIG. 8 is a partial cross-sectional view of a device according to a sixth embodiment of the invention whose profiled elements have a terraced or staircase profile.

In the embodiment in FIG. 8, to which reference will now be made, the device comprises profiled elements 82 in a terraced or staircase shape, which, in the example, are located between a plate 32 applied against a wall 14 or other reception body, and a transparent plate 34.

By virtue of the particular configuration of the elements 82, the inner face 20 of the curtain does not "see" the outer face 18, and several radiation plugs are obtained, instead of a single one in the case of the preceding embodiments.

Figure 9:
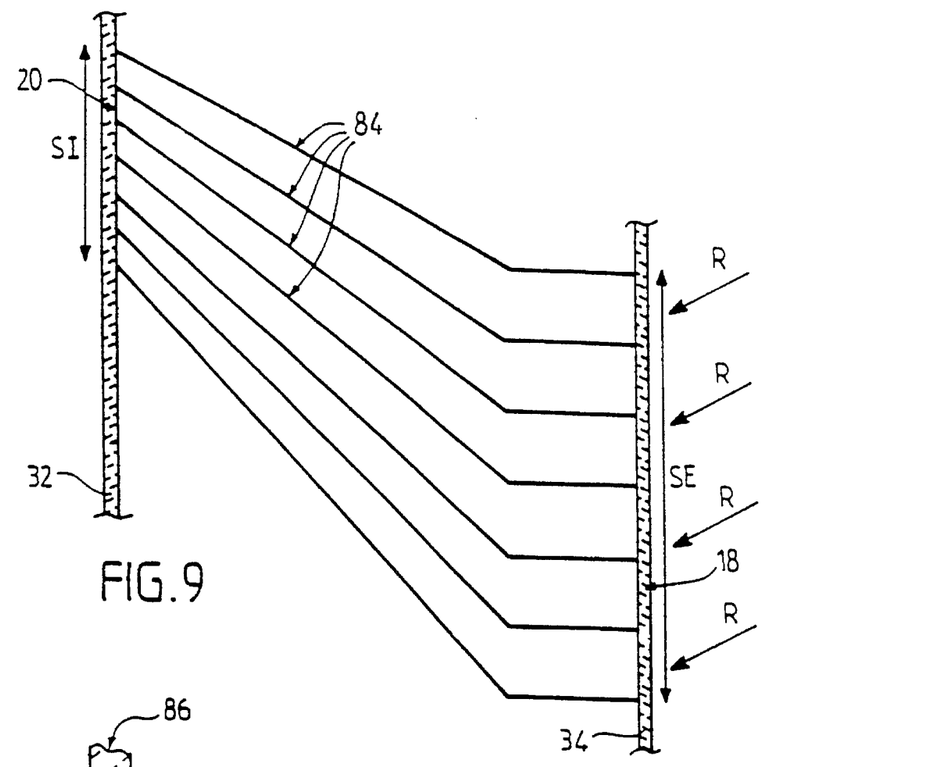
FIG. 9 is a partial cross-sectional view of a device according to a seventh embodiment of the invention, whose profiled elements are convergent.

In the embodiment in FIG. 9, to which reference will now be made, the device comprises a plurality of profiled elements 84 extending between an outer face 18 closed by a transparent plate 34, and an inner face 20 closed by a plate 32, which is transparent or non-transparent.

In the example, the profiled elements 84 converge from the outer face 18 as far as the inner face 20. A plurality of convergent air channels is thus obtained.

The result is that the outer surface area SE which receives the solar radiation is greater than the inner surface area SI situated on the side of the reception body. An effect of amplifying and concentrating the solar heat is thus obtained.

Figure 10:
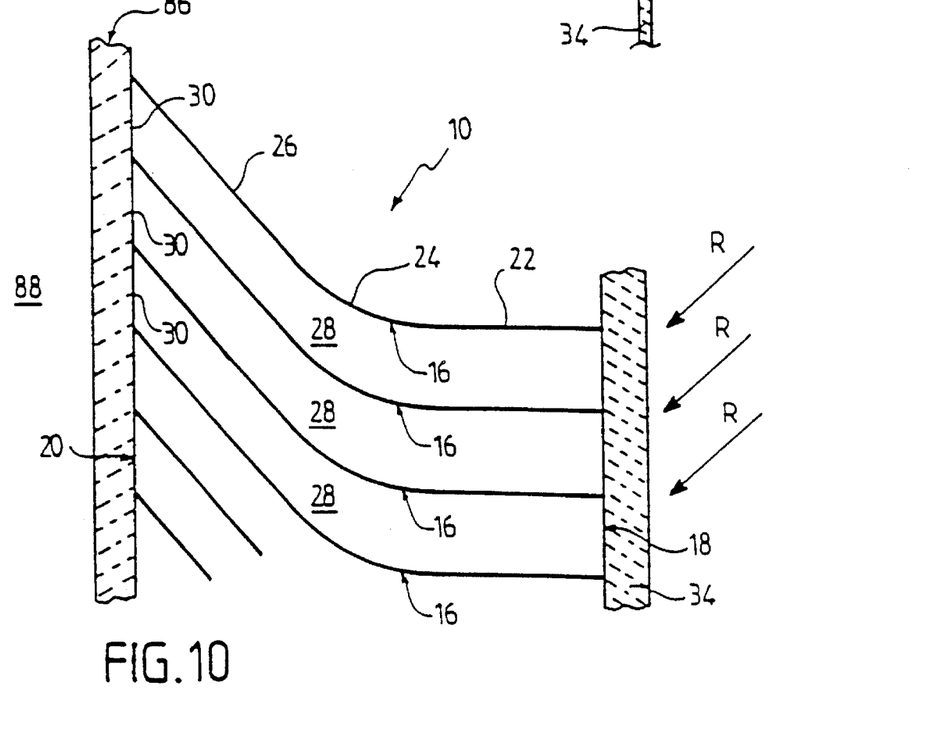
FIG. 10 is a cross-sectional view of a device according to an eighth embodiment of the invention intended to form a transparent wall.

In the embodiment in FIG. 10, to which reference will now be made, the device is produced in the form of a transparent wall. It comprises, in the example, a plurality of profiled elements 16 similar to those in FIG. 1, located between a transparent outer plate 34 exposed to solar radiation R, and an inner plate 86 which is also transparent. The plate 86 is intended to be located on the side of a reception body 88 which here constitutes the inner volume of the building. In this manner, an insulating wall is produced which retains the light energy, and which may be used for example to produce greenhouses, sports halls, verandas, etc.

In the embodiment in FIG. 11, to which reference will now be made, the device is produced in the form of a blind which corresponds to a slatted blind or a Venetian blind.

The device here comprises a plurality of profiled elements 90, each consisting of a slat or strip which is advantageously made of thin plastic. Here again, this plastic is fitted with a reflecting layer on each of its faces. The profile of each element 90 corresponds to that of the profiled elements 16 represented in FIGS. 1 and 4. The set of the elements 90 constitutes a blind 92, which, in the example, is placed inside a building behind a glazed face 94. The blind 92 comprises an outer face 18 which is open, and an inner face 20 which is closed by closure elements 96 joining the elements 90 on the side of the inner face 20 in pairs.

The blind 92 makes it possible to collect the solar energy coming from the solar radiation R and passing through the glazed surface 94. The device functions in the same manner as the preceding devices and makes it possible to immobilise the hot air in the channels delimited between the elements 90.

Figure 12:
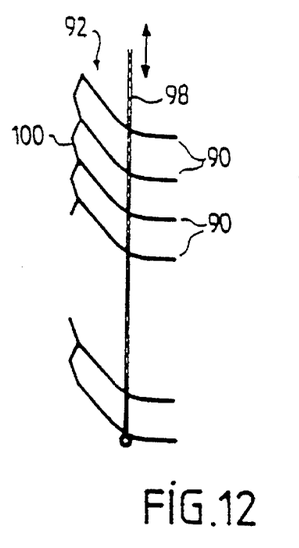
FIG. 12 is a sectional view showing in detail the structure of the device in FIG. 11.

As shown in FIG. 12, the elements 90 may be brought together or moved apart from each other via a draw cord or the like 98, as in the case of a known slatted blind.

In the embodiment in FIG. 12, the closure elements situated on the inner face 20 side of the blind are formed by a gusset 100 having a succession of folds, which are in the unfolded position in FIG. 12. When the profiled elements 90 are brought together under the action of the drawing means 98, the folds are brought together.

Figure 13:
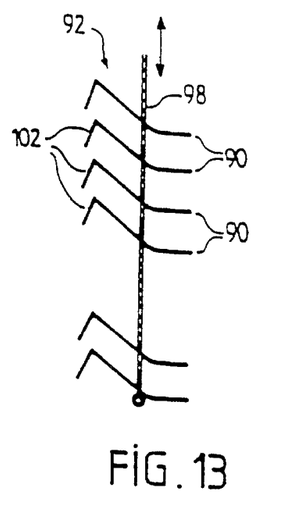
FIG. 13 is a sectional view showing a variant embodiment of the device in FIGS. 11 and 12.

In the embodiment in FIG. 13, the closure elements consist of individual elements 102 respectively extending the profiled elements 76 on the inner face side of the blind. In the example, the elements 102 form an acute angle with the element 90 from which they hang. These closure means only partially block the corresponding channels. Obviously, the blind 92 in FIGS. 11 to 13 might also be placed outside a building.

In the embodiment in FIG. 14, to which reference will now be made, the device is produced in the form of a shutter 104, which, in the example, is placed inside a building, behind a glazed surface 94 similar to that in FIG. 11.

The device 104 comprises a plurality of profiled elements 106 which are rigidly joined together by a backplate 108 which may be transparent or non-transparent.

Figure 11:
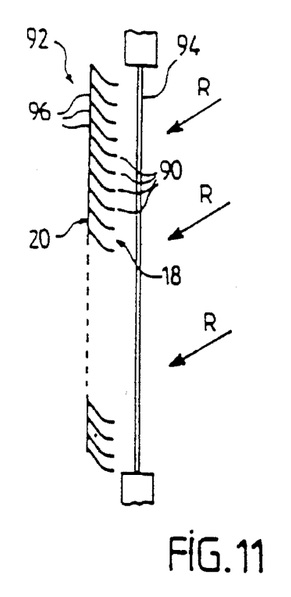
FIG. 11 is a cross-sectional view of a device according to the invention produced in the form of a blind placed behind a glazed surface.
Figure 14:
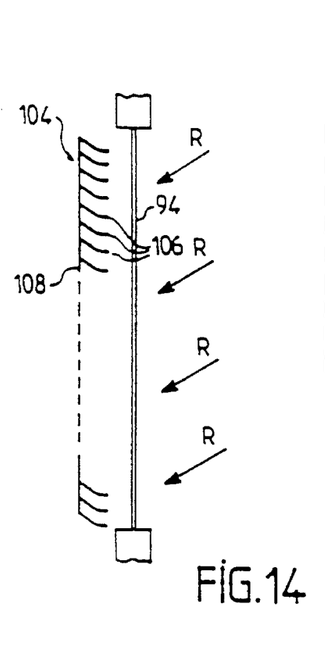
FIG. 14 is a partial sectional view of a device according to the invention produced in the form of a shutter placed behind a glazed surface.

In the case of the blind in FIGS. 11 to 13, or of the shutter in FIG. 14, the closure elements are advantageously transparent. Thus, the blind or the shutter allows the solar energy to penetrate, and thus allows heating, while preserving its insulating properties.

Figure 15:
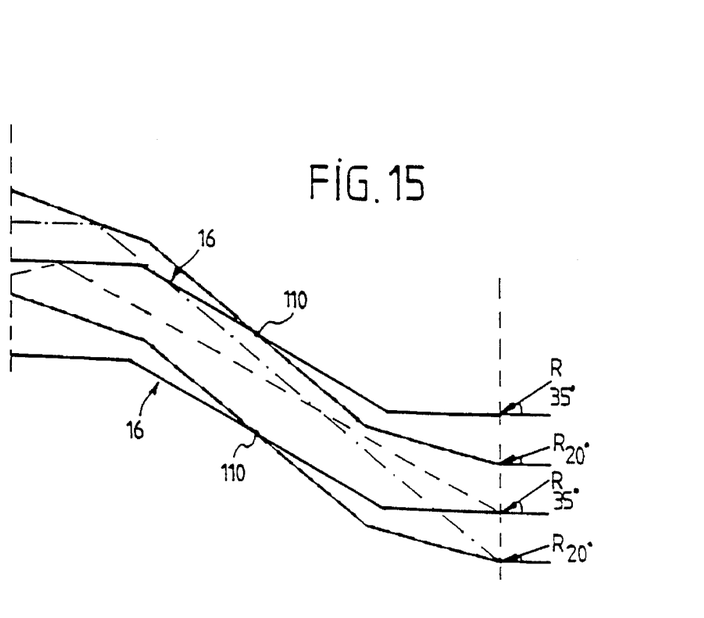
FIG. 15 is a partial sectional view of a device with pivoting profiled elements according to the invention.

In the embodiment in FIG. 15, the device comprises a multiplicity of profiled elements 16 mounted pivotally about respective parallel axes 110. These profiled elements can adopt various orientation positions as a function, for example, of the angle of inclination of the solar radiation R with respect to the horizontal.

FIG. 15 shows, in solid lines, two profiled elements in a first position which corresponds to a 35° angle of inclination of the solar radiation R. These two profiled elements are also represented in broken lines in a second position which corresponds to a 20° angle of inclination of the solar radiation R.

It is thus possible to optimize the operation of the device by taking into account the development of the solar radiation during the day.

As a variant, provision may be made to pivot a panel identical or similar to that in FIG. 3, on which the profiled elements are fixedly mounted.

It will be understood that the device of the invention finds a general application for collecting solar energy and transferring it towards a reception body, which may in particular be a wall of a building, a wall of a tank, etc.

The device of the invention makes it possible to collect the solar energy and to transfer it to a reception body, in a controlled manner, while forming a good insulator with a low thermal loss coefficient, the profiled elements ensuring a three-fold blocking: radiation, convection and conduction.

It should be noted that the device functions efficiently even in the case of very low insolation, or in the case of cloud cover.

I claim:

1. A device for collecting solar energy and transferring it to a reception body to be heated, comprising a plurality of substantially parallel profiled elements spaced apart and superposed in order to form a curtain having an outer face suitable for being exposed to solar radiation and an inner face suitable for being located on the reception body side, the profiled elements having two reflecting faces and a shape such that when the inner face is vertical, the profiled elements slope downwardly from the inner face to the outer face, the profiled elements defining a plurality of air channels directed upwards from the outer face to the inner face when the inner face is vertical, the profiled elements and the two reflecting faces thereof being formed of an insulating material so as not to conduct heat from the outer face to the inner face; and closure means provided on at least one of the inner face and the outer face of the curtain for sealing air contained in the channels.

2. A device according to claim 1, wherein each profiled element consists of a thin film with a curved profile.

3. A device according to claim 1, wherein each profiled element consists of two thin films with curved profile joined together along two end edges in order to define between the films an insulating space filled with air.

4. A device according to claim 1, wherein each profiled element is a solid element having a profile in the shape of a turbine blade.

5. A device according to claim 4, wherein the profiled elements have a continuous sloped profile without corners such that the solar radiation reaches the reception body by successive reflections on the reflecting faces of profiled elements, the outer face of the curtain not being visible from the inner face.

6. A device according to claim 5, wherein the profiled elements have a terraced or staircase profile.

7. A device according to claim 4, wherein the profiled elements have a generally rectilinear profile.

8. A device according to claim 7, further comprising a plurality of auxiliary members respectively extending from the profiled elements at the outer face of the curtain, each auxiliary member having an upper dark colored surface and a lower reflecting surface 9. A device according to claim 7, wherein the profiled elements converge from the outer face to the inner face the certain having a surface area at the inner and outer faces, the surface area of the outer face being greater than the surface area of the inner face.

10. A device according to claim 9, wherein the outer face of the curtain is fitted with a transparent plate.

11. A device according to claim 10, wherein the inner face of the curtain is fitted with a transparent plate so as to form a transparent wall.

12. A device according to claim 10, wherein the inner face of the curtain is fitted with a plate having a dark-coloured coating.

13. A device according to claim 7, further comprising a panel having a generally rectangular shape, extending in a direction from the inner face to the outer face, a plurality of profiled elements intersecting the panel, with the panel supporting said plurality of profiled elements.

14. A device according to claim 7, wherein the curtain is in the form of a blind in which the distance between profiled elements can be increased or decreased.

15. A device according to claim 7, wherein the curtain is in the form of a shutter in which the profiled elements are held fixed together by a plate.

16. A device according to claim 7, wherein the profiled elements are mounted to pivot synchronously about respective parallel axes.

17. A device according to claim 1, wherein each profiled element has a variable profile and comprises:

a fixed part which extends upwards from an intermediate region of the curtain towards the inner face;

an adjustable pivoting part which extends from the outer face of the curtain towards the intermediate region; and a pivot between the fixed part and the pivoting part.

* * * * *

UNITED STATES PATENT AND TRADEMARK OFFICE
CERTIFICATE OF CORRECTION

PATENT NO. : 5,497,762
DATED : March 12, 1996
INVENTOR(S) : Eugeniusz M. RYLEWSKI It is certified that error appears in the above-indentified patent and that said Letters Patent is hereby corrected as shown below:

Col. 1, line 52, delete "above".

Col. 5, line 6, change "According" to --according--.

Col. 10, line 65, change "profile" to --profiles--.

Col. 11, line 20, after "face" (second occurrence) insert --,--;

line 21, change "certain" to --curtain--.

Signed and Sealed this

Eleventh Day of June, 1996

BRUCE LEHMAN

Attest:

Attesting Officer

Commissioner of Patents and Trademarks